(12) United States Patent
Aamir et al.

(10) Patent No.: US 12,157,682 B1
(45) Date of Patent: Dec. 3, 2024

(54) REMOVAL OF ARSENIC BY LOOFAH SPONGE ENRICHED WITH STEAM ACTIVATED BIOCHAR

(71) Applicant: KING FAISAL UNIVERSITY, Al-Ahsa (SA)

(72) Inventors: Muhammad Aamir, Al-Ahsa (SA); Muhammad Hassan, Al-Ahsa (SA); Muhammad Amer Latif, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/425,489

(22) Filed: Jan. 29, 2024

(51) Int. Cl.
| | |
|---|---|
| *C02F 1/28* | (2023.01) |
| *B01J 20/20* | (2006.01) |
| *B01J 20/28* | (2006.01) |
| *B01J 20/30* | (2006.01) |
| *C02F 1/00* | (2023.01) |
| *C02F 101/10* | (2006.01) |

(52) U.S. Cl.
CPC .............. *C02F 1/283* (2013.01); *B01J 20/20* (2013.01); *B01J 20/28028* (2013.01); *B01J 20/3078* (2013.01); *C02F 1/001* (2013.01); *B01J 20/28054* (2013.01); *C02F 2101/103* (2013.01)

(58) Field of Classification Search
None
See application file for complete search history.

(56) References Cited

U.S. PATENT DOCUMENTS

| | | | | |
|---|---|---|---|---|
| 2020/0231482 | A1* | 7/2020 | Wilson | ............... C02F 9/00 |
| 2021/0370261 | A1* | 12/2021 | O'Neal | ............ C01B 32/318 |

FOREIGN PATENT DOCUMENTS

| | | |
|---|---|---|
| CN | 103861335 A | 6/2014 |
| CN | 110844959 A | 2/2020 |
| CN | 113457639 A | 10/2021 |
| DE | 10007039 A1 | 8/2001 |

OTHER PUBLICATIONS

I. O. Oboh and E. O. Aluyor, "Luffa cylindrica—an emerging cash crop," African Journal of Agricultural Research vol. 4 (8), pp. 684-688, Aug. 2009 (Year: 2009).*
Jon Alvarez, et al., Physical Activation of Rice Husk Pyrolysis Char for the Production of High Surface Area Activated Carbons, Industrial & Engineering Chemistry Research 2015 54 (29), 7241-7250 (Year: 2015).*
Tanvi, D. Abhijna, et al. "Biosorption of heavy metal arsenic from Industrial Sewage of Davangere District, Karnataka, India, using indigenous fungal isolates." SN Applied Sciences 2 (2020): 1-7.
Li, Xiao-ming, et al. "Kinetic studies for the biosorption of lead and copper ions by Penicillium simplicissimum immobilized within loofa sponge." Journal of Hazardous Materials 159.2-3 (2008): 610-615. Abstract.

* cited by examiner

*Primary Examiner* — Chester T Barry
(74) *Attorney, Agent, or Firm* — Nath, Goldberg & Meyer; Joshua B. Goldberg

(57) ABSTRACT

A loofah sponge enriched with steam activated biochar for removing arsenic from water. The loofah sponge can be a filtering media within a transparent acrylic cylinder. The filtering media can be used in methods and systems for removing arsenic from wastewater.

20 Claims, No Drawings

REMOVAL OF ARSENIC BY LOOFAH SPONGE ENRICHED WITH STEAM ACTIVATED BIOCHAR

BACKGROUND

1. Field

The present disclosure relates to removal of arsenic from wastewater, and particularly to use of a loofah sponge enriched with steam activated biochar for removing arsenic from water.

2. Description of the Related Art

Arsenic (As) is considered very toxic for the environment. It is widely found in areas where mining of the minerals is carried out and, during washing, it leaches into ground water resources and ground water bodies. Arsenic has very carcinogenic impacts on human and livestock health and water contaminated with arsenic is also considered unfit for agricultural purposes.

Long-term exposure to arsenic from drinking-water and food can cause cancer and skin lesions. It has also been associated with cardiovascular disease and diabetes. In utero and early childhood exposure has been linked to negative impacts on cognitive development and increased deaths in young adults.

However, until now, a safe, effective, and cost-conscious method or product for removing arsenic from wastewater has yet to be developed.

Thus, methods and products for removing arsenic from wastewater solving the aforementioned problems are desired.

SUMMARY

Presented herein is a facile, ecofriendly method and product to remove arsenic from wastewater. Specifically, the present subject matter relates to a filtering media used to remove arsenic from wastewater through a spongy media, or sponges, prepared from loofah. In an embodiment, the loofah sponges can be joined together to make a cylindrical sponge. In certain embodiments, the cylindrical sponge can be housed inside a transparent acrylic cylinder, thereby obtaining a sponge tube. This sponge tube can be further enriched with biochar prepared from rice straw at about 430° C. through a pyrolysis process. In certain embodiments, the biochar can be steam activated.

In this regard, the loofah sponge described herein can be enriched with steam activated biochar before water filtration. According to such embodiments, the prepared biochar can be first oven dried at about 105° C. for 24 hours until the prepared biochar is completely dry. The dried biochar can be further exposed to steam produced at about 320° C. for about 2 hours for activation purpose. The steam modification of the biochar works as an oxidizing agent to remove arsenic from wastewater. This steam activation can reduce the hydrophobicity and enhanced the polarity of the biochar surface, which enables it to provide higher adsorbent rate for arsenic removal with less reaction time.

In one embodiment, the present subject matter relates to a filtering media comprising: a cylindrical spongy media comprising one or more loofah sponges enriched with a steam activated biochar; and a transparent acrylic cylinder housing the cylindrical spongy media.

In another embodiment, the present subject matter relates to a method of removing arsenic from wastewater, the method comprising: inputting a wastewater comprising arsenic (As) to the filtering media as described herein; passing the wastewater through the filtering media; and outputting water having arsenic removed therefrom.

In a further embodiment, the present subject matter relates to a system for removing arsenic from wastewater, the system comprising: a cylindrical spongy media comprising one or more loofah sponges enriched with a steam activated biochar; and a transparent acrylic cylinder housing the cylindrical spongy media; a water inlet at a first end of the transparent acrylic cylinder for receiving a wastewater gas comprising arsenic (As) into the transparent acrylic cylinder; and a water outlet at a second end of the transparent acrylic cylinder for outputting a water with arsenic removed therefrom.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Presented herein is a facile, ecofriendly method and product to remove arsenic from wastewater. Specifically, the present subject matter relates to a filtering media used to remove arsenic from wastewater through a spongy media, or sponges, prepared from loofah. In an embodiment, the loofah sponges can be joined together to make a cylindrical sponge. In certain embodiments, the cylindrical sponge can be housed inside a transparent acrylic cylinder, thereby obtaining a sponge tube. This sponge tube can be further enriched with biochar prepared from rice straw at about 430° C. through a pyrolysis process. In certain embodiments, the biochar can be steam activated.

In this regard, the biochar can be made from rice straw. That is, the biochar can be rice straw-based biochar. In this regard, the biochar can be made by pyrolyzing the rice straw at about 430° C.

In this regard, the loofah sponge described herein can be enriched with steam activated biochar before water filtration. According to such embodiments, the prepared biochar can be first oven dried at about 105° C. for 24 hours until the prepared biochar is completely dry. The dried biochar can be further exposed to steam produced at about 320° C. for about 2 hours for activation purpose. The steam modification of the biochar works as an oxidizing agent to remove arsenic from wastewater. This steam activation can reduce the hydrophobicity and enhanced the polarity of the biochar surface, which enables it to provide higher adsorbent rate for arsenic removal with less reaction time.

In one embodiment, the present subject matter relates to a filtering media comprising: a cylindrical spongy media comprising one or more loofah sponges enriched with a steam activated biochar; and a transparent acrylic cylinder housing the cylindrical spongy media.

In one embodiment, the cylindrical spongy media used in the filtering media can have a length of about 15 cm and a diameter of about 8 cm. In another embodiment, the one or more loofah sponges can be enriched with about 5 g of the steam activated biochar. In this regard, the biochar can be prepared from rice straw at about 430° C. through a pyrolysis process.

In another embodiment of the present filtering media, the steam activated biochar can be exposed to steam before or after the loofah sponge is enriched with the steam activated biochar. More importantly, the loofah sponge can be enriched with 5 grams of steam activated biochar before water filtration therethrough. In this regard, the prepared biochar can be first oven dried at about 105° C. for about 24 hours to completely dry it. The dried biochar can then be further exposed to steam produced at 320° C. for 2 hours for activation purposes. The steam modification of the biochar can work as an oxidizing agent to remove arsenic from wastewater. The steam modification of biochar can increase the porosity of the biochar from about 31 $m^2$/gram to about 67 $m^2$/gram as measured through the Bruner Emitter Teller (BET) technique. Steam activation can reduce the hydrophobicity and enhance the polarity of the biochar surface, which enables it to provide higher adsorbent rate for arsenic removal with less reaction time.

In an additional embodiment of the present filtering media, the cylindrical spongy media can comprise multiple loofah sponges joined together.

In another embodiment, the present subject matter relates to a method of removing arsenic from wastewater, the method comprising: inputting a wastewater comprising arsenic (As) to the filtering media as described herein; passing the wastewater through the filtering media; and outputting water having arsenic removed therefrom.

In this regard, the present methods can remove up to 91% of arsenic from the wastewater with 120 minutes of filtration time and at a concentration of 0.6 mg/L of arsenic in the wastewater. In a different embodiment, the present methods can remove almost 78% of arsenic from the wastewater within 20 minutes of filtration time.

In a further embodiment, the present subject matter relates to a system for removing arsenic from wastewater, the system comprising: a cylindrical spongy media comprising one or more loofah sponges enriched with a steam activated biochar; and a transparent acrylic cylinder housing the cylindrical spongy media; a water inlet at a first end of the transparent acrylic cylinder for receiving a wastewater gas comprising arsenic (As) into the transparent acrylic cylinder; and a water outlet at a second end of the transparent acrylic cylinder for outputting a water with arsenic removed therefrom.

The present disclosure can be further understood by referring to the following examples.

EXAMPLES

Example 1

Removal of Arsenic from Wastewater

Synthetic solutions of arsenic were made with known concentrations of 0.1 mg/L, 0.2 mg/L, 0.3 mg/L, 0.4 mg/L, 0.5 mg/L, 0.6 mg/L, 0.7 mg/L, and 0.8 mg/L to evaluate the arsenic removal efficiency of the steam augmented loofah sponge. A spectrophotometer was utilized to measure the strength of the Arsenic (As) in the wastewater before and after passing from the filtration sponge.

The use of the biochar only removed the As up to 57% with 120 minutes filtration time while the steam activated biochar provided an As removal efficiency up to 91% with 120 minutes filtration time with a concentration of 0.6 mg/L. During the experimentation of As removal, almost 78% As removal was recorded during the initial 20 minutes using the steam activated biochar.

It is to be understood that the filtering media and methods and systems using the same are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A filtering media comprising:
a cylindrical spongy media comprising one or more loofah sponges enriched with a steam-activated biochar; and
a transparent acrylic cylinder housing the cylindrical spongy media.

2. The filtering media of claim 1, wherein the cylindrical spongy media has a length of about 15 cm and a diameter of about 8 cm.

3. The filtering media of claim 1, wherein the one or more loofah sponges are enriched with about 5 g of the steam-activated biochar.

4. The filtering media of claim 1, wherein the steam-activated biochar is exposed to steam before or after the loofah sponge is enriched with the steam-activated biochar.

5. The filtering media of claim 1, wherein the steam-activated biochar has a porosity of about 37 $m^2/g$ to about 67 $m^2/g$.

6. The filtering media of claim 1, wherein the cylindrical spongy media comprises multiple loofah sponges joined together.

7. A method of removing arsenic from wastewater, the method comprising:
inputting a wastewater comprising arsenic (As) to the filtering media of claim 1;
passing the wastewater through the filtering media; and
outputting water having arsenic removed therefrom.

8. The method of claim 7, wherein the method removes up to 91% of arsenic from the wastewater with 120 minutes of filtration time and at a concentration of 0.6 mg/L of arsenic in the wastewater.

9. The method of claim 7, wherein the method removes almost 78% of arsenic from the wastewater within 20 minutes of filtration time.

10. The method of claim 7, wherein the cylindrical spongy media has a length of about 15 cm and a diameter of about 8 cm.

11. The method of claim 7, wherein the one or more loofah sponges are enriched with about 5 g of the steam-activated biochar.

12. The method of claim 7, wherein the steam-activated biochar is exposed to steam before or after the loofah sponge is enriched with the steam-activated biochar.

13. The method of claim 12, wherein the exposure of the biochar to steam reduces hydrophobicity and enhances polarity of a surface of the biochar.

14. The method of claim 12, wherein the biochar is exposed to steam at about 320° C. for about 2 hours to activate the biochar.

15. The method of claim 7, wherein the steam-activated biochar has a porosity of about 37 $m^2/g$ to about 67 $m^2/g$.

16. A system for removing arsenic from wastewater, the system comprising:
a cylindrical spongy media comprising one or more loofah sponges enriched with a steam-activated biochar; and
a transparent acrylic cylinder housing the cylindrical spongy media;
a water inlet at a first end of the transparent acrylic cylinder for receiving a wastewater gas comprising arsenic (As) into the transparent acrylic cylinder; and
a water outlet at a second end of the transparent acrylic cylinder for outputting a water with arsenic removed therefrom.

17. The system of claim 16, wherein the cylindrical spongy media has a length of about 15 cm and a diameter of about 8 cm.

18. The system of claim 16, wherein the one or more loofah sponges are enriched with about 5 g of the steam-activated biochar.

19. The system of claim 18, wherein the steam-activated biochar is exposed to steam before or after the loofah sponge is enriched with the steam activated biochar.

20. The system of claim 18, wherein the steam-activated biochar has a porosity of about 37 $m^2/g$ to about 67 $m^2/g$.

* * * * *